United States Patent
Venumuddala et al.

(10) Patent No.: US 9,436,263 B2
(45) Date of Patent: Sep. 6, 2016

(54) SYSTEMS AND METHODS FOR POWER OPTIMIZATION USING THROUGHPUT FEEDBACK

(71) Applicant: QUALCOMM Incorporated, San Diego, CA (US)

(72) Inventors: Vinay Reddy Venumuddala, Bangalore KRN (IN); Nagarjuna Duvvuru, Bangalore KRN (IN); Gur Prasad Srivastava, Bangalore KRN (IN)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 14/186,745

(22) Filed: Feb. 21, 2014

(65) Prior Publication Data

US 2015/0241942 A1    Aug. 27, 2015

(51) Int. Cl.
   *G06F 1/32*    (2006.01)

(52) U.S. Cl.
   CPC ............. *G06F 1/3234* (2013.01); *G06F 1/32* (2013.01); *G06F 1/324* (2013.01); *G06F 1/3206* (2013.01); *G06F 1/3296* (2013.01)

(58) Field of Classification Search
   CPC ............. G06F 1/32; G06F 1/26; G06F 1/28; G06F 1/00
   USPC ....... 713/300, 310, 320, 321, 322, 323, 324, 713/330, 340, 375
   See application file for complete search history.

(56) References Cited

U.S. PATENT DOCUMENTS

| | | | |
|---|---|---|---|
| 7,840,825 B2 | 11/2010 | Altevogt et al. | |
| 2006/0206740 A1* | 9/2006 | Hurd | G06F 1/3203 713/322 |
| 2007/0061375 A1* | 3/2007 | Brown | G06F 17/30575 |
| 2008/0307240 A1 | 12/2008 | Dahan et al. | |
| 2010/0057404 A1 | 3/2010 | Dittmann et al. | |
| 2011/0055168 A1* | 3/2011 | Richards | G06F 17/30306 707/688 |
| 2011/0078477 A1 | 3/2011 | Park | |
| 2011/0154321 A1 | 6/2011 | Tian et al. | |
| 2011/0314312 A1 | 12/2011 | Naffziger et al. | |
| 2012/0017099 A1 | 1/2012 | David et al. | |
| 2012/0159496 A1 | 6/2012 | Dighe et al. | |
| 2013/0007762 A1* | 1/2013 | Krishnamurthy | G06F 9/5044 718/104 |
| 2013/0232346 A1 | 9/2013 | Wu | |
| 2014/0063026 A1* | 3/2014 | Oh | G06T 1/20 345/519 |
| 2015/0074276 A1* | 3/2015 | DeCusatis | H04L 67/1008 709/226 |

OTHER PUBLICATIONS

International Search Report and Written Opinion—PCT/US2015/015653—ISA/EPO—May 7, 2015.
Mehrotra R., et al., "A Power-Aware Modeling and Autonomic Management Framework for Distributed Computing Systems," 2012, Chapter 1, 39 pages.

* cited by examiner

*Primary Examiner* — Jaweed A Abbaszadeh
*Assistant Examiner* — Keshab Pandey
(74) *Attorney, Agent, or Firm* — Haynes and Boone, LLP

(57) ABSTRACT

A voltage and frequency scaling system for a processor is provided that may be implemented in dedicated logic or in software. The various voltage and frequency settings for the processor comprise a set of performance settings. The system includes a profiler module that maps each performance setting to a workload range for the processor. The profiler module also maps each workload range to a profiled throughput for the processor. Using a predicated average throughput from the mapping, the voltage and frequency scaling system advantageously selects from the performance settings and commands the processor to operate according to the selected performance setting.

12 Claims, 5 Drawing Sheets

314

| PERFORMANCE SETTING | WORKLOAD BIN | PROFILED THROUGHPUT |
|---|---|---|
| PS$_1$(v$_1$,f$_1$) | WLB$_1$ | T$_1$ |
| PS$_2$(v$_2$,f$_2$) | WLB$_2$ | T$_2$ |
| ⋮ | ⋮ | ⋮ |
| PS$_i$(v$_i$,f$_i$) | WLB$_i$ | T$_i$ |
| ⋮ | ⋮ | ⋮ |
| PS$_N$(v$_N$,f$_N$) | WLB$_N$ | T$_N$ |

400    402    404

314

| PERFORMANCE SETTING | WORKLOAD BIN | PROFILED THROUGHPUT |
|---|---|---|
| $PS_1(v_1,f_1)$ | $WLB_1$ | $T_1$ |
| $PS_2(v_2,f_2)$ | $WLB_2$ | $T_2$ |
| ⋮ | ⋮ | ⋮ |
| $PS_i(v_i,f_i)$ | $WLB_i$ | $T_i$ |
| ⋮ | ⋮ | ⋮ |
| $PS_N(v_N,f_N)$ | $WLB_N$ | $T_N$ |

SYSTEMS AND METHODS FOR POWER OPTIMIZATION USING THROUGHPUT FEEDBACK

TECHNICAL FIELD

This application relates to processors, and more particularly, to power optimization for processors.

BACKGROUND

One common technique for optimizing power consumption for a processor is dynamic voltage and frequency scaling (DVFS). In DVFS, the voltage and operating frequency (clocking) of the processor are varied depending upon the workload. If the processor has a light workload, it may operate at a lower voltage and frequency to save power. Conversely, if the processor workload becomes demanding, the voltage and frequency are increased accordingly. The DVFS control is typically implemented through software running on the processor itself. The DVFS software monitors the processor workload and chooses a suitable performance level (voltage and frequency setting) for the processor based on the processor workload. The performance level is often selected from a set of predetermined performance levels for the processor.

However, this type of software-based power optimization control can place additional computational stress on the processor to run the power optimization control itself. This added computation burden slows the DVFS implementation and leads to non-optimal voltage and frequency selections. Moreover, software-based power optimization control is architecture dependent. It can therefore be difficult to provide generic power optimization control that can be used for various processors implemented using various architectures.

There is thus a need in the art for a generalized power optimization strategy for different processor architectures with reduced computational overhead on the processor.

SUMMARY

A hardware-based voltage and frequency scaling system is provided that may free a processor from the computation workload necessary to calculate an appropriate power supply voltage and clock frequency setting for the processor. The voltage and frequency scaling performed by the system is applied with regard to a framing rate. In a given frame, the voltage and frequency scaling module determines the power supply voltage and clock frequency setting for the subsequent frame.

With regard to each frame, the voltage and frequency scaling system need only receive a workload (WL) and throughput (THPT) feedback from the processor. This is quite advantageous as the resulting scaling is thus independent of the processor architecture. Moreover, the processor has virtually no processing load with regard to the resulting voltage and frequency scaling. This scaling occurs with regard to a finite set of possible voltage and frequency values for the processor that are denoted herein as performance settings. Each performance setting thus corresponds to a particular supply voltage and clock frequency assignment for the processor. The voltage and frequency scaling system includes a mapping of the workload ranges associated with each performance setting. These workload ranges are denoted herein as "workload bins." In addition, the voltage and frequency scaling system maps the workload bins to corresponding profiled throughput values. This is quite advantageous as the voltage and frequency scaling system may then use these mappings to predict the average throughput value that will result from switching the processor from one performance setting to another. The performance setting selection can thus be made intelligently through a comparison of the predicted average throughput to a desired throughput for the processor. These and other advantages may be better appreciated by the detailed description below.

BRIEF DESCRIPTION OF THE DRAWINGS

FIG. 4 illustrates an example of a workload-throughput lookup table that may be used by a voltage and frequency scaling system in accordance with an embodiment of the disclosure.

DETAILED DESCRIPTION

Figure 1:
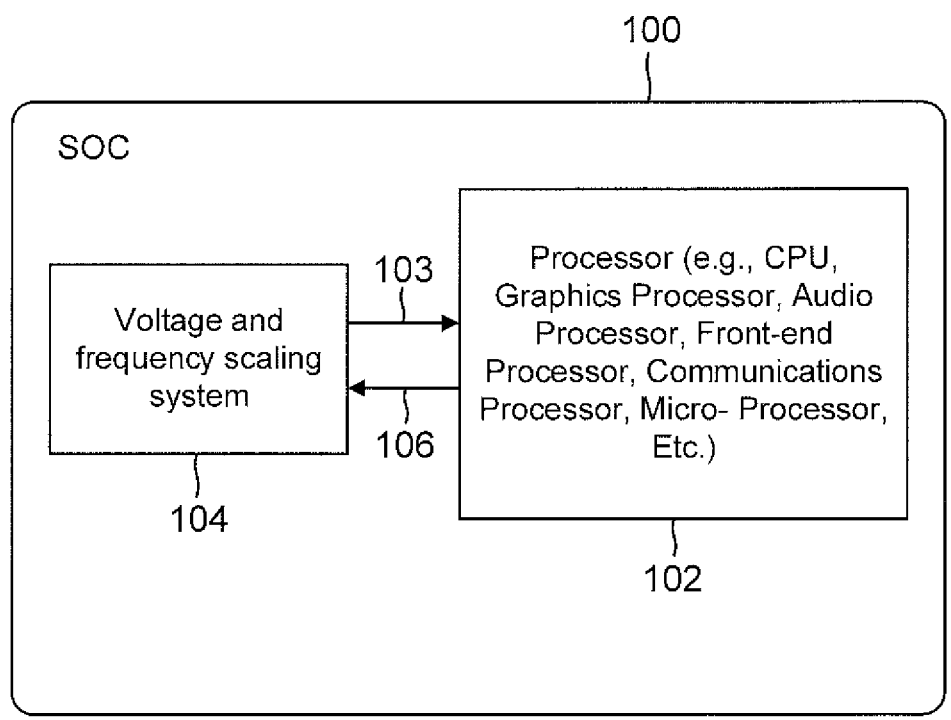
FIG. 1 illustrates an example system having a processor and a voltage and frequency scaling system in accordance with an embodiment of the disclosure.

For a better appreciation of the advantageous features for the voltage and frequency scaling system discussed herein, some preliminary concepts will first be discussed. In general, the concept of a processor "workload" is well-known in the processor arts. In that regard, a processor is a synchronous device that executes instructions at a clocking frequency or rate. The clocking is continuous—for example, if the clocking rate is 1 GHz, then the clock cycles every one-billionth of a second. But a processor does not necessarily execute an instruction responsive to each and every clock cycle. For example, a processor may be in an idle or standby mode such that it executes relatively few instructions over a given time period. Conversely, a processor may be performing a computation-intensive task such as advanced graphics processing in which the processor executes an instruction at virtually every clock cycle. One can thus appreciate that a clock cycle may be idle or it may correspond to an executed instruction. The concept of workload relates to the proportion of processor-executing-instruction clock cycles (execution clock cycles) vs. the total number of clock cycles over a given time period (e.g., a frame).

The voltage and frequency scaling systems disclosed herein operate with regard to frames (periods of time) such that a "current workload" for a given frame relates to the number of processor-executing-instructions clock cycles as compared to the total number of clock cycles in that frame. A related concept to workload is processor "throughput," which also has a generally-understood meaning in the processor arts and relates to the data output or analogous output from the computer. For example, a graphics processor may have to process a certain number of video frames per second (e.g., 30 frames per second or whatever is required under the relevant video standard). Similarly, a processor interfacing with a database may need to have the throughput to satisfy a certain number of database queries per second. This processing of data is quantified as necessary in the present disclosure so that a current throughput may be determined in a given frame. The voltage and frequency system disclosed herein thus receives two relevant numbers from the processor in a given frame: a workload signal and a throughput signal. This is quite advantageous as the resulting voltage and frequency scaling module is independent of the particular processor architecture. Indeed, the type of processor architecture is entirely irrelevant so long as it can provide a number or measure for its current workload (WL) and a number or measure for its current throughput (THPT).

With regard to receiving the current workload and throughput signals from the processor, it will be appreciated that the processor outputs these signals responsive to its processor clock frequency. The voltage and frequency scaling module may thus receive the current workload and throughput signals from the processor as running counts at the processor clock rate. Although the voltage and frequency scaling system functions to vary the processor clock rate as discussed further herein, the processor clock frequency for modern processors is typically relatively fast such as several MHz or even several GHz. In contrast, the frame rate for the voltage and frequency scaling system is relatively slow in comparison to the processor clock frequency. For example, in one embodiment, each frame is 50 ms in duration. The voltage and frequency scaling system may reset the running counts it receives from the processor at the beginning of every frame. In this fashion, the voltage and frequency scaling module down converts the current workload and throughput signals from the processor clock rate to its frame rate.

Not only is the voltage and frequency scaling system independent of the processor architecture as discussed above, it also advantageously predicts the expected workload and average throughput for the subsequent frame with respect to any given frame in a series of frames. In that regard, a processor will typically have only a relatively small set of voltage and frequency settings. In other words, a voltage and frequency scaling process cannot adjust the operating voltage and frequency for the processor to some arbitrary level. Instead, the processor is typically designed to operate at just a few voltage levels. For example, a processor may be configurable to operate according to a low supply voltage, a medium supply voltage, and a high supply voltage such that the processor may use two frequencies at each possible voltage level. In such a processor, there would then be six different voltage and frequency pairs that a voltage and frequency scaling system may select from with regard to commanding a given voltage and clock frequency for the processor. As used herein, a particular supply voltage setting and a corresponding clock frequency are denoted as a "performance setting." In the previous processor example, there are thus six performance settings that may be selected from by a voltage and frequency scaling system. Recall that the processor clock rate is relatively fast compared to the voltage and frequency scaling frame rate. For example, a clock signal having a frequency of 1 GHz cycles 50 thousand times over the duration of a 50 ms frame. A current workload in such a frame could thus range from no clock cycles corresponding to an executed instruction to all 50 thousand clock cycles corresponding to executed instructions. There are thus considerably more possible workload values than there are available performance settings.

One can thus appreciate that a range of workloads may be assigned to each performance setting. In other words, it was conventional in the prior art to observe that the current workload was within some range and to adjust the performance setting accordingly. As used herein, the range of current workload levels that correspond to particular performance settings (e.g., workload ranges) are referred to as "workload bins." But the disclosed voltage and frequency scaling system does far more than simply adjust the performance setting responsive to an observation that the current workload corresponds to a particular bin value. In particular, the disclosed voltage and frequency scaling system profiles the processor behavior to dynamically match the workload bins to an expected or profiled throughput value. In that regard, note that the relationship between workload and throughput is inherently dynamic in most processes. For example, a graphics processor may switch from one graphics processing mode to another over time such that the number of clock cycles corresponding to a unit of throughput may change dramatically during a video processing sessions. The corresponding optimal performance setting (the voltage and clocking frequency) for the processor to achieve a desired throughput thus may be advantageously predicted by the voltage and frequency scaling system.

These concepts and features may be better appreciated by the following discussion of example embodiments.

Example Embodiments

Turning now the drawings, FIG. 1 illustrates a system on a chip (SOC) 100 that includes a hardware-based voltage and frequency scaling system 104 for power optimization. The hardware-based voltage and frequency scaling system 104 may use processor throughput information in, for example, an adaptive throughput feedback process for power optimization. As shown in FIG. 1, voltage and frequency scaling system 104 determines a performance setting 103 (a selection of a particular voltage and frequency assignment) for a processor 102. Processor 102 may comprise a central processing unit (CPU), a graphics processor, an audio processor, a front-end processor, a communications processor, a microprocessor or other suitable architectures. Voltage and frequency scaling system 104 is advantageously independent of the particular processor architecture in system 100. Indeed, all that voltage and frequency scaling system 104 needs from processor 102 are the workload and throughput signals (shown generically as feedback 106) as discussed further herein. A voltage and frequency system such as voltage and frequency scaling system 104 may include a plurality of logic gates external to the processor 102. However, it should also be appreciated by those skilled in the art that the processor may be programmed to implement a voltage and frequency system that performs the functions of voltage and frequency scaling system 104.

Figure 2:
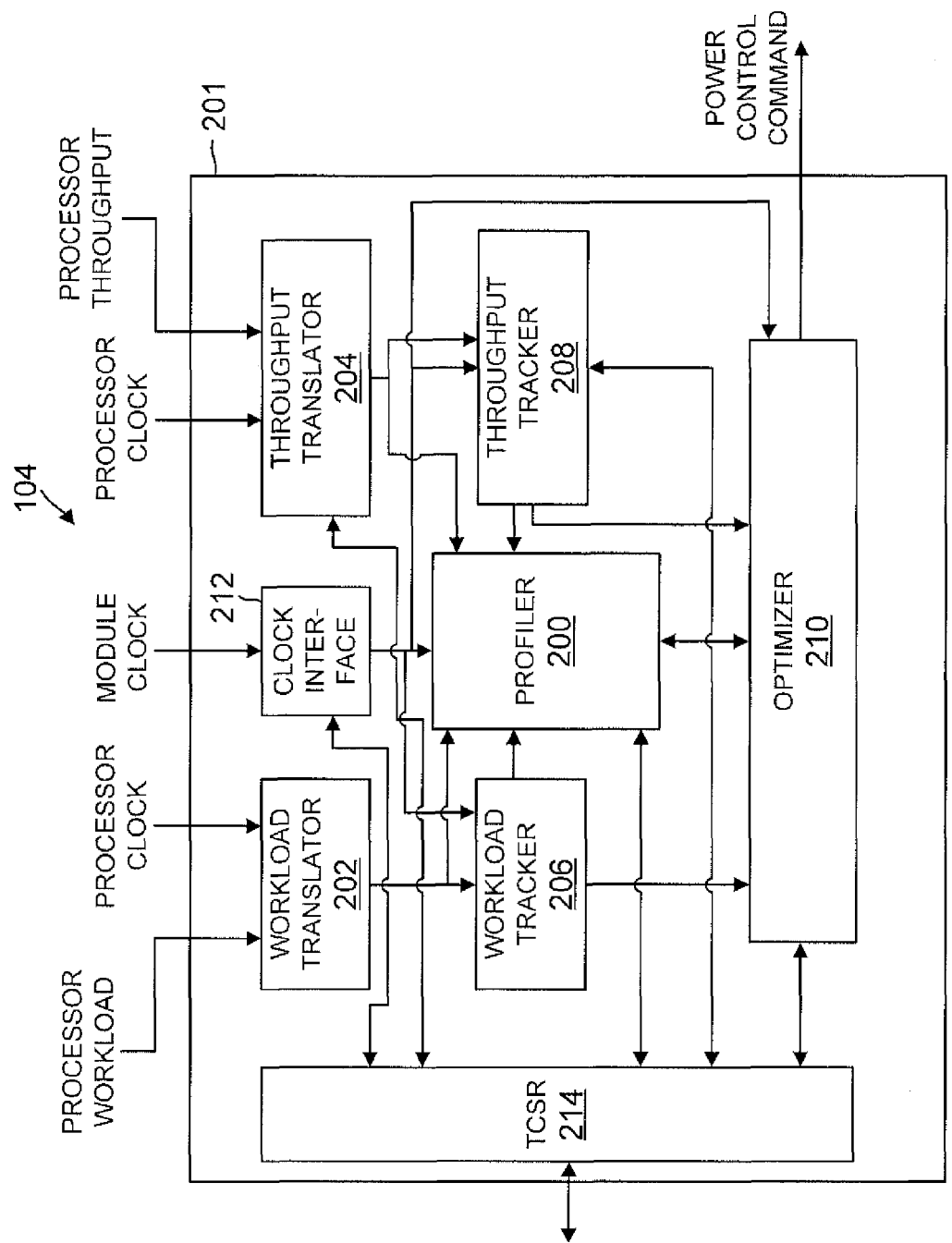
FIG. 2 illustrates an example architecture for the voltage and frequency scaling system of FIG. 1 in accordance with an embodiment of the disclosure.

Voltage and frequency scaling system 104 may comprise a number of functional components. For example, as shown in FIG. 2, voltage and frequency scaling system 104 may include a workload (WL) translator module 202, a throughput (THPT) translator module 204, a workload tracker module 206, a throughput tracker module 208, an optimizer module 210 for deciding whether to modify the processor performance setting, and a processor workload and throughput profiler module 200.

As discussed earlier, voltage and frequency scaling system 104 works with regard to frames. It will be appreciated that the duration or length of the frames is a design choice. However, the following discussion will assume without loss of generality that the frame duration is, for example, 50 ms. With regard to each frame, translators 202 and 204 may maintain counters to translate the workload and throughput signals as received from processor 102 (illustrated as feedback 106 in FIG. 1) at the processor clocking rate to the frame rate. In any given frame, workload translator module 202 receives the workload signal from the processor and determines a current workload (CW) accordingly for that frame. As used herein, a "frame" without further limitation refers to the current frame. In that regard, throughput translator module 204 receives the throughput signal from the processor and determines a current throughput (CT) for the frame.

Workload tracker module 206 determines an average workload (AW) from the current workload CW (as determined by workload translator 202 for a frame) and from a previous average workload (PAW) as earlier calculated by workload tracker module 206 for the preceding frame. For example, workload tracker module 206 may calculate the average workload using the following equation [1]:

$$AW = ((X*CW) + (M-X)*PAW)/M \qquad \text{Eq. [1]}$$

where X and M are weighting factors. These factors set the weight to be given to the current workload CW as opposed to the previous average workload PAW and may be set by the processor during a configuration of voltage and frequency scaling system 104 prior to its operation. For example, voltage and frequency scaling system 104 may include a top-level control and status register (TCSR) interface 214 containing registers that store values such as the weighting factors. The processor 102 may write to these registers (not illustrated) to configure voltage and frequency scaling system 104 accordingly. It will be appreciated that the calculation of the average workload may be determined using a variety of other equations. For example, workload tracker module 206 may use not only the current workload but also previous current workloads from preceding frames in the calculation of the average workload AW.

Throughput tracker module 208 functions analogously as discussed with regard to workload tracker module 206. Thus, throughput tracker module 208 calculates an average throughput (Ac) based upon the current throughput CT from throughput translator module 204 and a previous average throughput (PAc) as calculated. In one embodiment, throughput tracker module 208 may calculate an average throughput (Ac) using the following equation [2]:

$$Ac = (CT + (N-1)*PAc)/N \qquad \text{Eq. [2]}$$

where N defines the number of frames over which the average throughput Ac is determined. The factor N may be set by the processor through TCSR interface 214. It will be appreciated that the calculation of the average throughput may be determined using a variety of other equations. For example, throughput tracker module 208 may use not only the current throughput but also previous current throughputs from preceding frames in the calculation of the average throughput Ac.

Optimizer module 210 compares the average throughput to a desired throughput level R, which may be set by the processor through interface 214. If the average throughput is less than the desired throughput level, optimizer module 210 may switch the processor to the next performance setting. As discussed earlier, there is a finite set of performance settings. For example, in one embodiment, the processor is operable according to six performance settings. These performance settings may be deemed to be arranged from a lowest performance setting (lowest voltage and clock frequency) to a highest performance setting. The performance settings may thus be numbered in order from the lowest power performance setting to the highest power performance setting. In any given frame, the processor is operating according to a current performance setting, which may be designated as the ith setting in the set of integers corresponding to the numbering of the performance settings. Switching the processor to the next performance setting thus changes the processor from the ith performance setting to the (i+1)th performance setting (or higher). Conversely, if the average throughput exceeds the desired throughput, optimizer module 210 may need to decrease the performance setting to the (i−1)th setting (or lower).

To make an intelligent performance setting selection, optimizer module 210 predicts the workload (Wp) for the subsequent frame based upon the current workload CW and the average workload AW. For example, optimizer module may calculate the predicted workload Wp using the following equation [3]:

$$Wp = Y*CW + (1-Y)*AW \qquad \text{Eq. [3]}$$

where Y is a factor for assigning the relative weight between the current workload CW and the average workload AW. The processor may set factor Y through interface 214. It will be appreciated that the calculation of the predicted workload Wp may be determined using a variety of other equations. For example, throughput tracker module 208 may not only use the current workload CW but also previous current workloads from preceding frames in the calculation of the predicted workload Wp. Note that the predicted workload calculation assumes that the processor performance setting remains unchanged. Such an assumption is not applicable if optimizer module 210 increases the performance setting in response to the average throughput Ac being less than the desired throughput R. As will be discussed further herein, optimizer module 210 thus does not use the predicted workload Wp in such a case. However, optimizer module 210 might not change the performance setting if it determines that the average throughput Ac is greater than the desired throughput R. The optimizer module 210 thus uses the predicted workload Wp if Ac is greater than R.

Optimizer module 210 may use the predicted workload Wp to obtain a corresponding expected throughput from profiler module 200. In that regard, recall that a range of workloads correspond to each performance setting since the number of performance settings is generally markedly smaller than the number of possible workload values. For example, in an embodiment in which the processor clocking frequency is 1 GHz and the frame period is 50 ms, the current workload CW for a frame may vary from 0 all the way to 50,000. Profiler module 200 thus assigns a range of potential current workload values to each performance setting. Each range of possible current workload values corresponding to a performance setting (e.g., each workload range) is designated herein as a workload bin. The processor may be run offline during a configuration of voltage and frequency scaling module 104 so that profiler module 200 may determine the bin assignments (range of workload values that correspond to each performance setting). Given this bin structure, profiler module 200 may then dynamically build a lookup table between the current workload bins (workload ranges) and the profiled throughputs. Alternatively, this mapping between the current workload and the profiled throughputs may be performed offline.

For example, profiler module 200 may obtain the current workload CW and map it to the corresponding bin (which may be designated as the ith bin for generality). Profiler module 200 calculates a profiled throughput Ti for the ith bin accordingly. The current throughput (which maps to the ith bin) may then be averaged with the profiled throughput for ith bin (Tip) as obtained from a previous frame. For example, profiler module 200 may calculate the profiled throughput Ti for the ith bin using the following equation [4]:

$$Ti = X*Tc + (1-X)*Tip \qquad \text{Eq. [4]}$$

where X is a weighting factor as discussed with regard to Eq. [1] and Tc is the current throughput computed for a workload corresponding to the ith bin during profiling. It will be appreciated that a dynamic profiling, in which there is a training phase during which the processor runs at the maximum performance setting, may be used to construct the lookup table between each workload bin (sometimes referred to herein as a workload range) and the corresponding profiled throughput Ti.

Referring again to the situation in which optimizer module 210 determines that the current average throughput Ac is greater than the desired throughput, profiler module 200 may determine which bin corresponds to the predicted workload Wp and thus identify the corresponding profiled throughput Ti accordingly. Since this profiled throughput Ti corresponds to the predicted workload Wp, it will be referred to herein as profiled throughput 1 (PTW1). Optimizer module 210 may then calculate a predicted throughput Ap1 for the next frame based upon the current average throughput Ac and the profiled throughput PTW1 such as by using the following equation [5]:

$$Ap1 = (PTW1 + (N-1)*Ac)/N \qquad \text{Eq. [5]}$$

where N is one of the weighting factors discussed with regard to Eq. [1]. Note that there are two possibilities with regard to Ap1: like the current average throughput Ac, it may be greater or less than the desired throughput R. If both Ac and Ap1 are greater than the desired throughput R, optimizer module 210 may then shift the processor to the next lower performance setting. Such a performance setting shift is justified since the predicted average throughput Ap1 for the subsequent frame is larger than desired throughput R. In such a case, power may be conserved by shifting to the lower performance setting yet the desired throughput R would still be expected to be satisfied. Alternatively, it may be that Ap1 is less than R whereas the current frame's average throughput Ac is greater than R. In such a case, optimizer module 200 may simply leave the performance setting unchanged for the next frame.

As noted above, if optimizer module 210 determines that the current average throughput Ac is less than the desired throughput R, the performance setting for the processor should be increased. In that regard, the performance setting for a current frame may be designated as the ith performance setting (corresponding to the ith workload bin in profiler module 200 without loss of generality). If Ac is less than R, optimizer module 210 may thus shift the processor to the (i+1)th performance setting (which corresponds to the (i+1)th workload bin). From the workload bin, profiler module 200 may retrieve a profiled throughput from its lookup table. This retrieved profiled throughput is designated herein as the profiled throughput 2 (PTW2). The retrieval of PTW2 is quite advantageous as optimizer module 210 may then calculate a predicted average throughput for the next frame based upon the shift to the (i+1)th performance setting. For example, optimizer module 210 may then calculate a predicted average throughput Ap2 for the next frame based upon the current average throughput Ac and the profiled throughput PTW2 such as by using the following equation [6]:

$$Ap2 = (PTW2 + (N-1)*Ac)/N \qquad \text{Eq. [6]}$$

where N is one of the weighting factors discussed with regard to Eq. [1]. Optimizer module 210 may then compare the predicted average throughput Ap2 to the desired throughput R. If this comparison shows that Ap2 is greater than R, then optimizer module 210 may command the processor to switch to the (i+1)th performance setting in the next frame. But if Ap2 is less than the desired throughput R, such a performance setting increase will be insufficient to satisfy the desired throughput R. Thus, in one embodiment, optimizer module 210 may command the processor to switch to the maximum performance setting in the next frame if Ap2 is less than R.

Power optimization module 104 may also include additional modules such as clock interface 212 (e.g., a 50 millisecond (ms) interface for an exemplary frame size of 50 ms). Clock interface 212 may send an interrupt at the end of a DVFS frame to reset counters in translators 202 and 204, to store measured data in trackers 206 and 208, and to register processor modeling information (e.g., to store performance setting, workload, and throughput information in a lookup table) in profiler 200. TCSR interface 214 may be configured to communicate through a bus with software running on processor 102 (e.g., during a configuration operation for module 104).

Example methods of use for optimizer module 104 and system 100 will now be discussed.

Example Methods of Use

Figure 3:
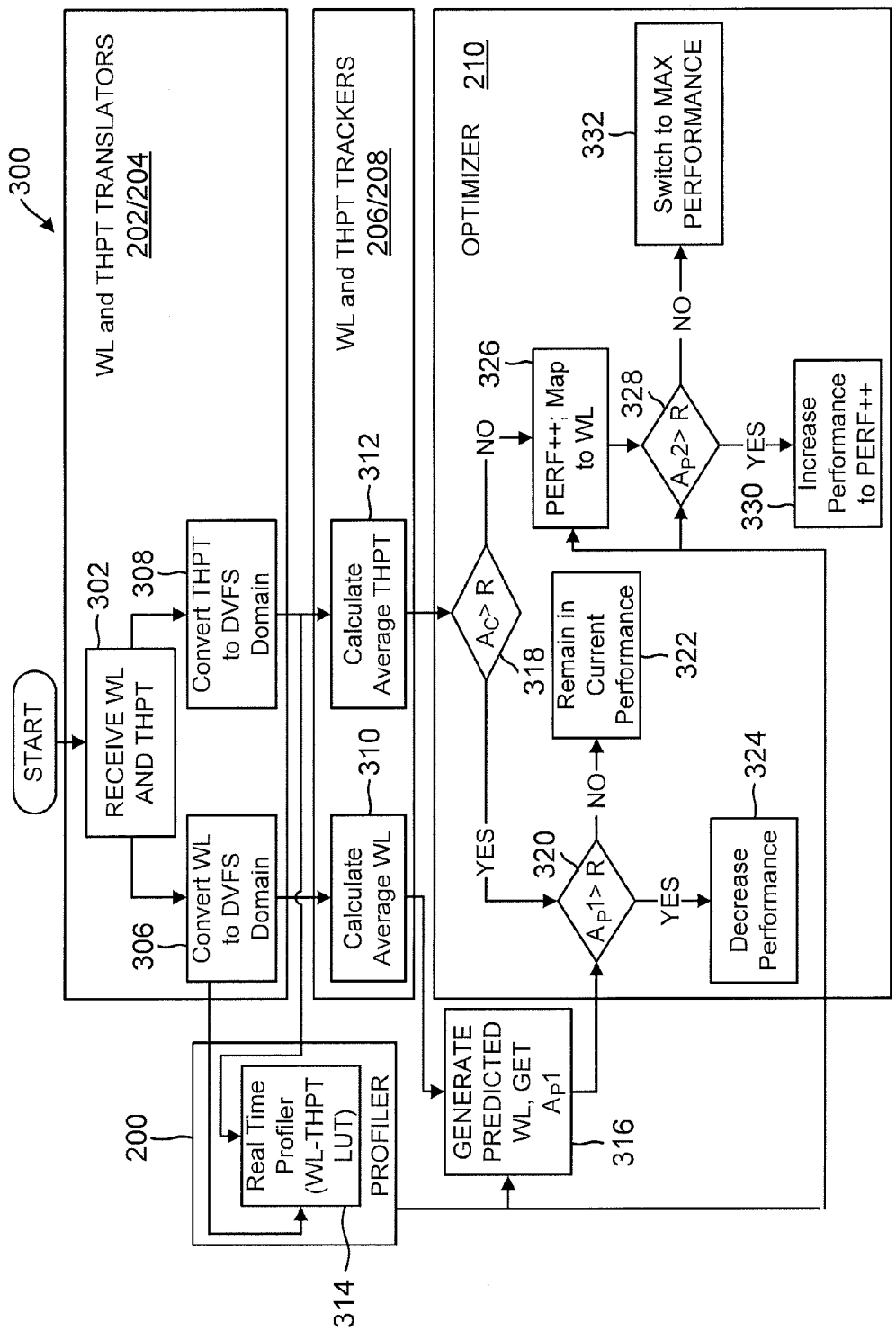
FIG. 3 illustrates an example process for optimizing power consumption and performance for a processor using a power optimization module in accordance with an embodiment of the disclosure.

A flow diagram for an example method 300 of use of a voltage and frequency scaling system 104 of FIGS. 1 and 2 is shown in FIG. 3. The method begins in a step 302 in which a current processor workload signal and a current processor throughput signal may be received from processor 102.

At block 306, the obtained current processor workload signal may be converted (e.g., by WL translator 202) to the DVFS domain to obtain a current processor workload CW as described herein.

At block 308, the obtained current processor throughput signal may be converted (e.g., by THPT translator 204) to the DVFS domain to obtain a current processor throughput CT as described herein.

The current workload CW and current throughput CT may be provided to profiler 200. Profiler 200 may generate and/or maintain a workload-throughput lookup table (WL-THPT LUT) 314 using the current workload CW and current throughput CT. For example, profiler 200 may assign each current workload CW into one of a set of predefined workload ranges (e.g., a set of workload bins that each corresponds to a range of workload values as described herein) as the current workload CW is received from the processor many times during operation of the processor. Profiler 200 may also generate and maintain a corresponding profiled throughput for each workload bin as the current throughput CT is received from the processor many times during operation of the processor.

For example, a current workload CW and throughput CT pair may be received and processed such that the current workload CW is assigned to a workload bin and the current throughput CT is averaged into a current profiled throughput value that is stored in association with that workload bin in LUT 314 as described above in connection with, for example, equation 4. If desired, the current throughput may be given a higher weight than older throughputs when averaging the current throughput into the profiled throughput so that changes over time in the performance of the processor are accounted for in LUT 314. In this way, a dynamically updated profiled throughput that corresponds to each workload bin (sometimes referred to herein as a workload range) may be stored and continuously updated in the lookup table.

Referring now to FIG. 4, lookup table 314 may include a column 402 of workload bins (e.g., workload ranges such as workload bin WLB1, workload bin WLBi . . . WLBN), a column 404 of corresponding profiled throughputs (e.g., profiled throughput T1, profiled throughput Ti . . . TN), and a column 400 of corresponding processor performance settings (e.g., performance setting PS1, performance setting PSi . . . PSN). Performance settings in column 400 for each workload bin in column 402 may be optimal performance settings for each bin that have been determined during, for example, a one-time configuration operation for system 104 when system 104 is installed (e.g., in system 100).

A configuration operation for initially filling columns 400 and 402 of lookup table 314 may include static offline profiling of the processor to determine and store optimal performance levels for supporting given numbers of processor non-idle execution cycles. Initial values of profiled throughputs in column 404 may be determined and stored offline or dynamically during operation of the processor by collecting and averaging throughput values when the processor has various workload values within a given workload bin.

Workload bins WLBi may each correspond to a range of workload values. Each profiled throughput in column 404 may be an average (e.g., a weighted average) of throughputs associated with any workload value in a corresponding workload bin as described herein. At any given time, the information stored in profiler 200 (e.g., lookup table 314) may therefore serve as an approximate model for the processor.

Each processor performance setting of a processor may be defined by an operating voltage and an operating clock frequency of the processor as described herein. For example, a lowest processor setting PSI may be defined by a lowest operating voltage V1 and a lowest operating frequency f1. Another higher performance setting PSi may be defined by an operating voltage Vi and an operating frequency fi. Operating voltage Vi and/or operating frequency fi, for a value of i greater than 1, may be higher than lowest operating voltage V1 and lowest operating frequency f1.

Referring again to FIG. 3, the current workload CW and current throughput CT may be provided to WL and THPT trackers 206 and 208. At block 310, WL tracker 206 may calculate an average workload AW as described above in connection with, for example, equation 1.

At block 312, THPT tracker 208 may calculate a current average throughput Ac as described above in connection with, for example, equation 2.

At block 318, optimizer 210 may determine whether the average throughput Ac is greater than the desired throughput R.

The desired throughput R may be provided to system 104 and stored (e.g., in control and status registers in the module) or the desired throughput R may be determined by the system. In scenarios where the desired throughput is not known prior to task execution, the throughput may be monitored for a brief period of time (e.g., an adjustable time period) while the system is running at a maximum performance level. The average throughput during this time period may be measured and used as the desired throughput for upcoming DVFS frames.

If the average throughput Ac is less than or equal to the desired throughput R, module 210 may proceed to block 326. At block 326, an incrementally increased performance setting (PERF++) may be determined and mapped to a corresponding workload bin, and hence, a corresponding predicted throughput Ap2 using LUT 314 as described above in connection with, for example, equation 6. For example, if a processor is running at a lowest processor performance setting PS1 (see FIG. 4), module 104 may identify a setting PS2 (i=2) as the incrementally increased performance setting PERF++ a and obtain a profiled throughput T2 corresponding to that performance setting and to the corresponding workload bin WLB2. In this example, profiled throughput T2 may be used as PTW2 in equation 6 to compute throughput Ap2.

At block 328, it may be determined whether the predicted throughput Ap2 for the incrementally increased performance level is greater than the desired throughput R.

If, at block 328, the predicted throughput Ap2 is less than or equal to the desired throughput R, module 210 may proceed to block 332. At block 332, system 104 may command the processor to switch the processor performance setting to a maximum (MAX PERFORMANCE) performance setting PSN (e.g., a maximum allowable operating voltage and a maximum allowable operating frequency). A maximum allowable operating voltage and a maximum allowable operating frequency may be defined by the manufacturer of the processor or the assembler or operator of system 100 (as examples). In response to receiving the command to increase the processor performance setting to the maximum performance setting, the processor may increase the performance setting directly to the maximum performance setting or the processor may step (discretely or continuously) through intermediate performance settings to the maximum performance setting.

If, at block 328, the predicted average throughput Ap2 is greater than the desired throughput R, module 210 may proceed to block 330. At block 330, system 104 may command the processor to switch the processor performance setting to the incrementally increased performance setting (PERF++).

Although embodiments have been described in which power optimization module 104 generates instructions to incrementally increase performance or increase performance to a maximum performance setting, it should be appreciated that, in other embodiments, the operations of blocks 326 and 328 can be repeated to test multiple incrementally increased performance settings until a performance setting having a predicted throughput that is greater than the desired throughput is discovered. In these embodiments, system 104 may generate and send instructions to the processor to incrementally increase the performance setting after each iteration of blocks 326 and 328 or system 104 may send a single instruction to increase the performance setting to the discovered performance setting having the predicted throughput that is greater than the required throughput only when that performance setting is discovered.

The operations performed in connection with blocks 326, 328, 330, and 332 may increase the performance setting of processor 102 as appropriate to improve processor performance when the current average throughput is below the desired throughput.

If, at block 318, the current average throughput Ac is greater than the desired throughput R, module 210 may instead proceed to block 320. At block 320, it may be determined whether a predicted average throughput Ap1 that depends on a predicted workload Wp is greater than the desired throughput R. The predicted throughput Ap1 may be determined by predicting the average workload Wp as described above in connection with, for example, equation 3, obtaining a profiled throughput (e.g., PTW1) from LUT 314, and determining predicted throughput Ap1 as described above in connection with, for example, equation 5 at block 316. The operations of block 316 may be performed by module 210, profiler 200, or other modules or combinations of modules in power optimization system 104.

If, at block 320, the predicted throughput Ap1 is determined to be less than or equal to the desired throughput R, optimizer 210 may proceed to block 322. At block 322, power optimization system 104 may command the processor to remain at the current performance setting (e.g., by sending instructions to continue operating the processor with the current operating voltage and the current operating frequency by not sending any performance setting update command to the processor).

If, at block 320, the predicted throughput Ap1 is greater than the desired throughput R, module 210 may proceed to block 324. At block 324, system 104 may command the processor to decrease the current performance setting. According to various embodiments, the command to decrease the current performance setting may include instructions to decrement the performance setting to an incrementally decreased discrete performance setting, to continuously decrease the performance setting, or to decrease the performance setting to a minimum performance setting.

In this way, the operations performed in connection with blocks 320, 322, and 324 may maintain or decrease the performance setting of processor 102 as appropriate to conserve power when the current average throughput is higher than the desired throughput.

Figure 5:
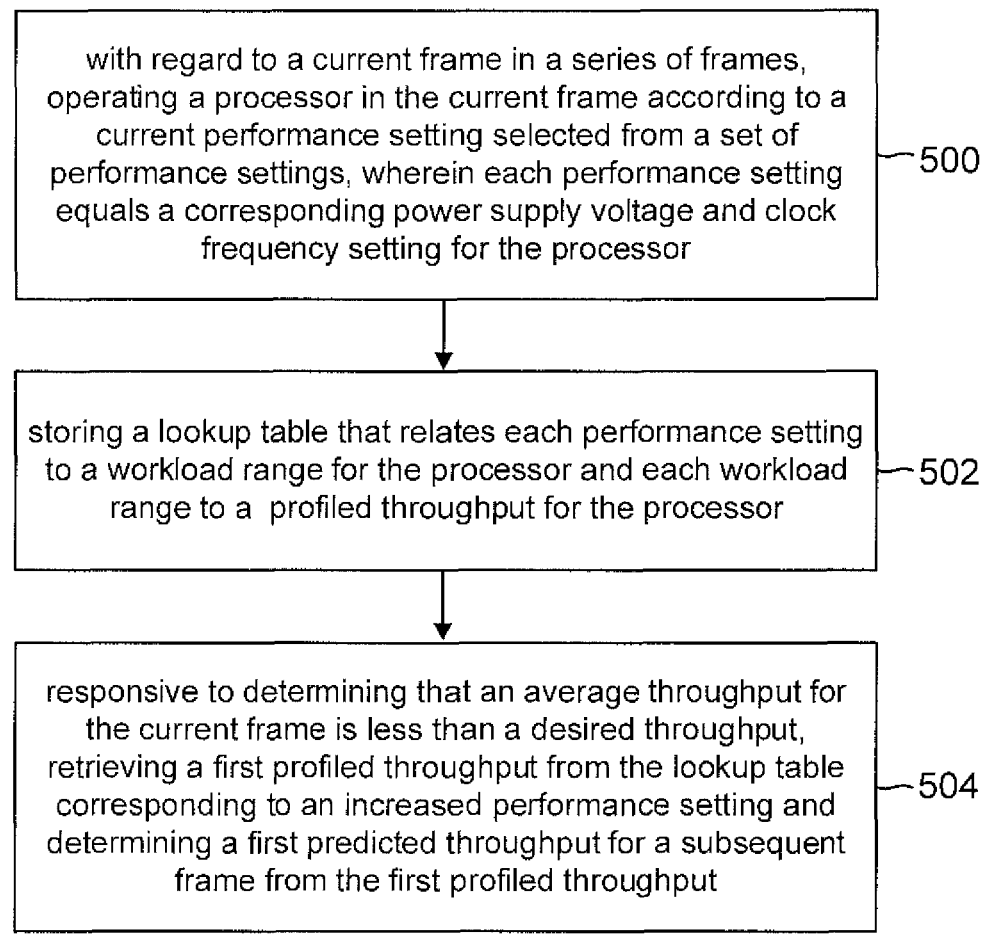
FIG. 5 illustrates a flowchart of an example method of use for the system of FIG. 1 in accordance with an embodiment of the disclosure.

A flowchart for an example method of use of a system having a power optimization module such as system 100 of FIG. 1 is shown in FIG. 5.

The method includes a step 500 of, with regard to a current frame in a series of frames, operating a processor in the current frame according to a current performance setting selected from a set of performance settings, wherein each performance setting equals a corresponding power supply voltage and clock frequency setting for the processor.

The method includes a step 502 of storing a lookup table that relates each performance setting to a workload range for the processor and each workload range to a profiled throughput for the processor.

The method includes a step 504 of responsive to a determination that an average throughput for the current frame is less than a desired throughput, retrieving a first profiled throughput from the lookup table corresponding to an increased performance setting and determining a first predicted throughput for a subsequent frame from the first profiled throughput.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A voltage and frequency system for an integrated circuit; comprising:

a processor operable according to a selection from a set of power supply voltage and clock frequency performance settings;

a throughput tracker logic circuit configured to calculate a current average throughput in a current frame in a series of frames from a current throughput for the processor and from at least one previous average throughput for a preceding frame;

a profiler logic circuit configured to determine a mapping relating each performance setting to a corresponding workload range for the processor and relating each performance setting to a corresponding profiled throughput for the processor, wherein each workload range relates to a range of processor-executing-instruction clock cycles over each frame; and an optimizer logic circuit configured to retrieve a first profiled throughput from the mapping responsive to a determination that the current average throughput is less than a desired average throughput, wherein the first profiled throughput corresponds to an increased performance setting, and to determine a first predicted throughput for a subsequent frame from the first profiled throughput and to command the processor to operate according to the increased performance setting in the subsequent frame responsive to a determination that the first predicted throughput is greater than the desired average throughput.

2. The voltage and frequency system of claim 1, further comprising:

a workload translator logic circuit configured to receive a workload signal from the processor during each of the frames and to calculate a current workload for the processor in each frame from the received workload signal; and a throughput translator logic circuit configured to receive a throughput signal from the processor during each of the frames and to calculate the current throughput for the processor in each frame from the received throughput signal.

3. The voltage and frequency system of claim 2, further comprising:

a workload tracker logic circuit configured to calculate an average workload in the current frame from the current workload for the current frame and from at least one average workload for a preceding frame, wherein the optimizer logic circuit is further configured to determine a predicted workload for the subsequent frame based upon the average workload for the current frame and the current workload, and wherein the optimizer logic circuit is further configured to determine the workload range corresponding to the predicted workload and to use the mapping to determine a second predicted average throughput based upon the profiled throughput corresponding to the determined workload range and to command the processor to operate according to a decreased performance setting in the subsequent frame responsive to a determination that both the first predicated throughput and the second predicted throughput are greater than the desired average throughput.

4. The voltage and frequency system of claim 1, wherein the increased performance setting is a subsequent performance setting to the selection.

5. The voltage and frequency system of claim 1, wherein the increased performance setting is the maximum performance setting.

6. The voltage and frequency system of claim 1, further comprising an interface to the processor, wherein the interface is configured to store the desired average throughput as received from the processor.

7. A method, comprising:
with regard to a current frame in a series of frames, operating a processor in the current frame according to a current performance setting selected from a set of performance settings, wherein each performance setting comprises a corresponding power supply voltage and clock frequency setting for the processor;
determining a current average throughput for the processor responsive to the processor's operation during the current frame;
storing a lookup table that relates each performance setting to a workload range for the processor and each performance setting to a profiled throughput for the processor, wherein each workload range relates to a range of processor-executing-instruction clock cycles over each frame;
responsive to a determination that the average throughput for the current frame is less than a desired average throughput, retrieving a first profiled throughput from the lookup table corresponding to an increased performance setting and determining a first predicted throughput for a subsequent frame from the first profiled throughput; and
commanding the processor to operate according to the increased performance setting in a subsequent frame responsive to a determination that the first predicted throughput is greater than the desired average throughput.

8. The method of claim 7, wherein the performance settings are arranged sequentially from a lowest performance setting to a highest performance setting, and wherein the increased performance setting corresponds to the subsequent performance setting to the current performance setting in the sequence.

9. The method of claim 7, further comprising:
commanding the processor to operate in the subsequent frame according to a maximum one of the performance setting responsive to the first predicted throughput being less than the desired average throughput.

10. The method of claim 7, further comprising:
determining a predicted workload for the subsequent frame;
determining which workload range includes the predicted workload; and
responsive to a determination that the average throughput for the current frame is greater than the desired average throughput, retrieving a second profiled throughput from the lookup table corresponding to the determined workload range and determining a second predicted throughput for the subsequent frame based upon the second profiled throughput.

11. The method of claim 10, further comprising:
commanding the processor to operate in the subsequent frame according to the current performance setting responsive to a determination that the second predicted throughput is less than the desired average throughput.

12. The method of claim 10, wherein the performance settings are arranged sequentially from a lowest performance setting to a highest performance setting, and wherein a decreased performance setting corresponds to a preceding performance setting to the current performance setting in the sequence, the method further comprising:
commanding the processor to operate in the subsequent frame according to the decreased performance setting responsive to a determination that the second predicated throughput is greater than the desired average throughput.

* * * * *